(12) United States Patent
Huff et al.

(10) Patent No.: US 10,088,202 B2
(45) Date of Patent: Oct. 2, 2018

(54) REFRIGERANT VAPOR COMPRESSION SYSTEM OPERATION

(75) Inventors: Hans-Joachim Huff, Maninz (DE); Lucy Yi Liu, Fayetteville, NY (US); Suresh Duraisamy, Liverpool, NY (US); Zvonko Asprovski, Liverpool, NY (US); Mark S. Rogers, Hastings, NY (US); KeonWoo Lee, Manlius, NY (US)

(73) Assignee: CARRIER CORPORATION, Farmington, CT (US)

( * ) Notice: Subject to any disclaimer, the term of this patent is extended or adjusted under 35 U.S.C. 154(b) by 1381 days.

(21) Appl. No.: 13/499,927

(22) PCT Filed: Oct. 11, 2010

(86) PCT No.: PCT/US2010/052144
§ 371 (c)(1),
(2), (4) Date: Apr. 3, 2012

(87) PCT Pub. No.: WO2011/049767
PCT Pub. Date: Apr. 28, 2011

(65) Prior Publication Data
US 2012/0192579 A1    Aug. 2, 2012

Related U.S. Application Data

(60) Provisional application No. 61/254,277, filed on Oct. 23, 2009.

(51) Int. Cl.
*F25B 49/02* (2006.01)
*F25B 41/04* (2006.01)
(Continued)

(52) U.S. Cl.
CPC ............. *F25B 1/10* (2013.01); *B60H 1/3232* (2013.01); *F25B 41/043* (2013.01);
(Continued)

(58) Field of Classification Search
CPC .......... F25B 2400/13; F25B 2700/1933; F25B 2500/26; F25B 2500/07; F25B 2600/2517;
(Continued)

(56) References Cited

U.S. PATENT DOCUMENTS 2,933,904 A * 4/1960 Wellman ................... F25B 1/00
62/196.4
3,324,671 A * 6/1967 Harnish .................. F25B 13/00
62/149
(Continued)

FOREIGN PATENT DOCUMENTS

CN         101065622 A      10/2007
CN         101097100 A       1/2008
(Continued)

OTHER PUBLICATIONS

International Preliminary Report on Patentability dated May 3, 2012.
(Continued)

*Primary Examiner* — Len Tran
*Assistant Examiner* — Kirstin Oswald
(74) *Attorney, Agent, or Firm* — Cantor Colburn LLP

(57) ABSTRACT

A method is provided for protecting a refrigerant vapor compression system during a standstill period following shutdown of the refrigerant vapor compression system. A method is provided for detecting a low refrigerant charge level in a refrigerant vapor compression system operating in a transcritical mode. A refrigerant vapor compression system is provided that includes a controller operative to perform a refrigerant charge detection method.

4 Claims, 3 Drawing Sheets

(51) Int. Cl.
*F25B 1/00* (2006.01)
*F25B 1/10* (2006.01)
*B60H 1/32* (2006.01)
*F25B 49/00* (2006.01)
*F25B 9/00* (2006.01)
*F25B 45/00* (2006.01)
*F25B 31/00* (2006.01)

(52) U.S. Cl.
CPC ............ *F25B 49/005* (2013.01); *F25B 9/008* (2013.01); *F25B 31/008* (2013.01); *F25B 45/00* (2013.01); *F25B 2309/061* (2013.01); *F25B 2400/13* (2013.01); *F25B 2400/23* (2013.01); *F25B 2500/07* (2013.01); *F25B 2600/0261* (2013.01); *F25B 2600/2509* (2013.01); *F25B 2600/2525* (2013.01)

(58) Field of Classification Search
CPC .. F25B 2600/2525; F25B 1/10; F25B 49/005; F25B 41/043; F25B 31/008; F25B 2309/061; F25B 45/00; F25B 2600/2509; F25B 2600/0261; F25B 2400/23; B60H 1/3232
USPC ............................ 62/149, 510, 512, 115, 222
See application file for complete search history.

(56) References Cited

U.S. PATENT DOCUMENTS

| | | | |
|---|---|---|---|
| 3,563,051 A * | 2/1971 | Baumgartner ........ | F25B 31/002 62/468 |
| 4,254,630 A | 3/1981 | Geary | |
| 4,265,091 A | 5/1981 | Kobayashi | |
| 5,076,067 A | 12/1991 | Prenger et al. | |
| 5,140,826 A | 8/1992 | Hanson et al. | |
| 5,161,383 A | 11/1992 | Hanson et al. | |
| 5,241,839 A | 9/1993 | Hughes | |
| 5,245,836 A | 9/1993 | Lorentzen et al. | |
| 5,313,805 A * | 5/1994 | Blackmon ............. | F25B 43/043 62/195 |
| 5,398,519 A * | 3/1995 | Weber ................ | H05K 7/20381 165/41 |
| 5,438,841 A | 8/1995 | Cahill-O'Brien et al. | |
| 5,457,963 A | 10/1995 | Cahill-O'Brien et al. | |
| 5,515,690 A * | 5/1996 | Blackmon ............. | F25B 43/043 62/158 |
| 5,542,261 A * | 8/1996 | Albertson ............... | F25B 1/053 62/149 |
| 5,934,095 A | 8/1999 | Tyree, Jr. | |
| 5,946,925 A | 9/1999 | Williams et al. | |
| 5,996,364 A | 12/1999 | Lifson et al. | |
| 6,205,798 B1 | 3/2001 | Porter et al. | |
| 6,233,952 B1 | 5/2001 | Porter et al. | |
| 6,427,479 B1 | 8/2002 | Komatsubara et al. | |
| 6,643,567 B2 | 11/2003 | Kolk et al. | |
| 6,761,037 B2 | 7/2004 | Tsuboi et al. | |
| 6,821,098 B2 | 11/2004 | Lifson | |
| 6,868,678 B2 | 3/2005 | Mei et al. | |
| 6,883,341 B1 | 4/2005 | Lifson | |
| 7,131,291 B2 | 11/2006 | Aflekt et al. | |
| 7,178,352 B2 | 2/2007 | Lifson | |
| 7,178,362 B2 * | 2/2007 | Collings ................. | F25B 9/008 62/527 |
| 7,234,310 B2 | 6/2007 | Flynn et al. | |
| 7,237,405 B2 * | 7/2007 | Takegami ............... | F25B 13/00 62/498 |
| 7,343,750 B2 | 3/2008 | Lifson et al. | |
| 7,386,985 B2 | 6/2008 | Concha et al. | |
| 7,415,835 B2 | 8/2008 | Cowans et al. | |
| 7,472,555 B2 | 1/2009 | Kirby et al. | |
| 2004/0182101 A1 * | 9/2004 | Shimoda ................. | F25B 13/00 62/324.1 |
| 2005/0109050 A1 | 5/2005 | Laboe et al. | |
| 2005/0132728 A1 * | 6/2005 | Lifson ..................... | F25B 45/00 62/149 |
| 2005/0247071 A1 * | 11/2005 | Nemit, Jr. ............... | F25B 41/04 62/197 |
| 2006/0000596 A1 * | 1/2006 | Kranz ...................... | F25B 1/04 165/203 |
| 2006/0138771 A1 | 6/2006 | Galante et al. | |
| 2006/0248904 A1 | 11/2006 | Ludwig | |
| 2007/0163276 A1 | 7/2007 | Braun et al. | |
| 2008/0066490 A1 | 3/2008 | Santeler | |
| 2008/0264080 A1 | 10/2008 | Creed et al. | |
| 2008/0319587 A1 | 12/2008 | Cowans et al. | |
| 2009/0044548 A1 | 2/2009 | Masoudipour et al. | |

FOREIGN PATENT DOCUMENTS

| | | |
|---|---|---|
| CN | 101166941 A | 4/2008 |
| CN | 101326416 A | 12/2008 |
| EP | 1040947 | 10/2000 |
| EP | 1124099 | 8/2001 |
| EP | 1618345 B1 | 1/2006 |
| WO | 2009091397 | 7/2009 |

OTHER PUBLICATIONS

International Search Report and Written Opinion dated May 2, 2011.
Chinese First Office Action for application CN 201510429801.4, dated, 9 pages.

* cited by examiner

REFRIGERANT VAPOR COMPRESSION SYSTEM OPERATION

CROSS-REFERENCE TO RELATED APPLICATION

Reference is made to and this application claims priority from and the benefit of U.S. Provisional Application Ser. No. 61/254,277, filed Oct. 23, 2009, and entitled REFRIGERANT VAPOR COMPRESSION SYSTEM OPERATION, which application is incorporated herein in its entirety by reference.

FIELD OF THE INVENTION

This invention relates generally to vapor compression systems and, more particularly, to the operation of refrigeration vapor compression systems.

BACKGROUND OF THE INVENTION

Conventional vapor compression systems typically include a compressor, a heat rejection heat exchanger, a heat absorption heat exchanger, and expansion device, commonly an expansion valve, disposed upstream with respect to working fluid flow, of the heat absorption heat exchanger and downstream of the heat rejection heat exchanger. These basic system components are interconnected by working fluid lines in a closed circuit, arranged in accord with known vapor compression cycles.

In some vapor compression systems, capacity modulation capability may be added by incorporating a flash tank economizer is into the working fluid circuit between the heat rejection heat exchanger and the evaporator. In such case, the working fluid leaving the heat rejection heat exchanger is expanded through an economizer expansion device, such as a thermostatic expansion valve or an electronic expansion valve, prior to entering the flash tank wherein the expanded fluid separates into a liquid component and a vapor component. The vapor component is thence directed from the flash tank into an intermediate pressure stage of the compression process of a multi-stage compression device, while the liquid component is directed from the flash tank through the system's main expansion valve prior to entering the evaporator.

Depending upon the characteristics of the working fluid in use in a particular application, a vapor compression system may be operated in either a subcritical mode or a transcritical mode. In vapor compression systems operating in a subcritical cycle, both the vapor heat rejection heat exchanger and the heat absorption heat exchanger operate at pressures below the critical pressure of the working fluid. Thus, in the subcritical mode, the vapor heat rejection heat exchanger functions as a working fluid condenser and the heat absorption heat exchanger functions as a working fluid evaporator.

However, in refrigerant vapor compression systems operating in a transcritical cycle, the vapor heat rejection heat exchanger operates at a refrigerant temperature and pressure in excess of the refrigerant's critical pressure, while the heat absorption heat exchanger operates at a refrigerant temperature and pressure in the subcritical range. Thus, in the transcritical mode, the vapor heat rejection heat exchanger functions as a working fluid gas cooler and the heat absorption heat exchanger functions an as a working fluid evaporator.

In vapor compression systems used in refrigeration applications, commonly referred to as refrigerant vapor compression systems, the working fluid is refrigerant. Refrigerant vapor compression systems charged with conventional refrigerants, such as for example, fluorocarbon refrigerants such as, but not limited to, hydrochlorofluorocarbons (HCFCs), such as R22, and more commonly hydrofluorocarbons (HFCs), such as R134a, R404A, and R407C, typically operate in the subcritical mode. "Natural" refrigerants, such as carbon dioxide, are also used in refrigerant vapor compression systems instead of HCFC or HFC refrigerants. Because carbon dioxide has a low critical temperature, most refrigerant vapor compression systems charged with carbon dioxide as the refrigerant are designed for operation in the transcritical mode.

Refrigerant vapor compression systems are commonly used for conditioning air to be supplied to a climate controlled comfort zone within a residence, office building, hospital, school, restaurant or other facility. Refrigerant vapor compression system are also commonly used for refrigerating air supplied to display cases, merchandisers, freezer cabinets, cold rooms or other perishable/frozen product storage areas in commercial establishments. Refrigerant vapor compression systems are also commonly used in transport refrigeration systems for refrigerating air supplied to a temperature controlled cargo space of a truck, trailer, container or the like for transporting perishable/frozen items by truck, rail, ship or intermodal.

Refrigerant vapor compression systems used in connection with transport refrigeration systems are generally subject to more stringent operating conditions than in air conditioning or commercial refrigeration applications due to the wide range of operating load conditions and the wide range of outdoor ambient conditions over which the refrigerant vapor compression system must operate to maintain product within the cargo space at a desired temperature. The desired temperature at which the cargo needs to be controlled can also vary over a wide range depending on the nature of cargo to be preserved. The refrigerant vapor compression system must not only have sufficient capacity to rapidly pull down the temperature of product loaded into the cargo space at ambient temperature, but also operate efficiently at low load when maintaining a stable product temperature during transport. Additionally, transport refrigerant vapor compression systems are subject to cycling between an operating mode and standstill mode, i.e. an idle state.

In more complex refrigeration vapor compression systems, such as those equipped with a multi-stage compression device and capacity modulation, it is customary to provide a number of refrigerant flow control devices to permit selective control of refrigerant flow through the various branches of the refrigerant circuit. In operation of conventional refrigerant vapor compression systems, it is customary practice to position each flow control device in the refrigerant vapor compression system in a fully closed position during standstill that is when the refrigerant vapor compression system is idle.

With the flow control devices fully closed, the potential exists for refrigerant to be trapped in isolated pockets of the refrigerant circuit between fully closed flow control devices. If refrigerant becomes trapped in an isolated pocket during standstill, the pressure within the isolated pocket may increase to a level in excess of the design containment pressure of the tube, tank or other structure in which the refrigerant is resident, particularly on the low-pressure side of the refrigerant vapor compression system. If the refrigerant pressure within an isolated pocket does exceed the

SUMMARY OF THE INVENTION

A method is provided for protecting a refrigerant vapor compression system during a standstill period following shutdown of the refrigerant vapor compression system. The refrigerant vapor compression system has a primary refrigerant circuit having a high-pressure side downstream with respect to refrigerant flow of a compression device and upstream with respect to refrigerant flow of a primary expansion device and a low-pressure side downstream with respect to refrigerant flow of the primary expansion device and upstream with respect to refrigerant flow of the compression device. The method includes the step of: whenever during standstill a refrigerant pressure within an isolated pocket on the low-pressure side of said refrigerant circuit exceeds a predetermined standstill equalization pressure limit, relieving the refrigerant pressure within said isolated pocket.

In an embodiment, the step of relieving the refrigerant pressure within the isolated pocket includes venting the refrigerant pressure within the isolated pocket to ambient pressure outside the refrigerant circuit. In an embodiment, the step of relieving the refrigerant pressure within the isolated pocket includes venting the refrigerant pressure within the isolated pocket to a portion of the low-pressure side of the refrigerant circuit having a refrigerant pressure therein less than the predetermined maximum standstill equalization pressure limit. In an embodiment, the step of relieving the refrigerant pressure within the isolated pocket includes opening a flow control valve between the isolated pocket and a portion of the low-pressure side of the refrigerant circuit having a refrigerant pressure therein less than the predetermined maximum standstill equalization pressure limit. In an embodiment, the step of relieving the refrigerant pressure within the isolated pocket comprises maintaining during the standstill period an open refrigerant flow path throughout the low-pressure side of the refrigerant circuit.

A method is provided for detecting a refrigerant charge level in a refrigerant vapor compression system. The refrigerant vapor compression system has a primary refrigerant circuit including a refrigerant compression device, a refrigerant heat rejection heat exchanger downstream of the compression device, a refrigerant heat absorption heat exchanger downstream of the refrigerant heat rejection heat exchanger, and a primary expansion device disposed in the refrigerant circuit downstream of the refrigerant heat rejection heat exchanger and upstream of the refrigerant heat absorption heat exchanger. The method comprising the steps of: after a compressor shut down in the refrigerant vapor compression system, sensing a refrigerant equalization pressure and a refrigerant equalization temperature; and determining a refrigerant equalization density based upon the sensed refrigerant equalization pressure and the sensed equalization temperature is within a predetermined reference density range indicative of the refrigerant density in the refrigerant vapor compression system when at a proper refrigeration charge level.

In an embodiment, the step of detecting a low or high refrigerant charge level in a refrigerant vapor compression system operating in a transcritical mode comprises referencing the sensed equalization pressure and the sensed equalization temperature to a map of desired refrigerant density as a function of refrigerant temperature and refrigerant pressure. In an embodiment, the step of detecting a refrigerant charge level in a refrigerant vapor compression system comprises the steps of: calculating a refrigerant density from the sensed refrigerant equalization pressure and the sensed refrigerant equalization temperature; and comparing the calculated refrigerant density to the reference refrigerant density.

In an embodiment, the refrigerant vapor compressor system is capable of operating in transcritical mode or wherein the equalization state of the system is outside the two-phase region of the refrigerant.

In an embodiment, the compressor shutdown is during a standstill period following shutdown of the refrigerant vapor compression system.

In an embodiment, the sensed equalization pressure or the sensed equalization temperature is determined (a) a prescribed time into the standstill period, (b) measured before complete equalization or (c) is determined by indirect calculation of related system conductors.

A method is provided for detecting a refrigerant charge in a refrigerant vapor compression system having a refrigerant circuit including a refrigerant compression device, a refrigerant heat rejection heat exchanger downstream of said compression device, a refrigerant heat absorption heat exchanger downstream of said refrigerant heat rejection heat exchanger, and interconnecting refrigerant lines as active components. The method includes the steps of: operating the refrigerant vapor compression system in a mode wherein the refrigerant (e.g., all) is circulating within the active components of the refrigerant circuit; sensing the values of selected operating parameters of the refrigerant vapor compression system during operation; and comparing the sensed value of the selected operating parameters against a set of reference values for the selected operating parameters indicative of operation of the refrigerant vapor compression system with a proper refrigerant charge.

A refrigerant vapor compression system is provided that includes: a primary refrigerant circuit including a refrigerant compression device having a first compression stage and a second compression stage, a refrigerant heat rejection heat exchanger downstream of the compression device, a refrigerant heat absorption heat exchanger downstream of the refrigerant heat rejection heat exchanger, a primary expansion device disposed in the refrigerant circuit downstream of the refrigerant heat rejection heat exchanger and upstream of the refrigerant heat absorption heat exchanger, and an economizer circuit operatively associated with the primary refrigerant circuit, the economizer circuit including a refrigerant injection line opening to an intermediate pressure stage of the compression device and a flow control valve disposed in the refrigerant injection line; and a controller for controlling operation of the refrigeration vapor compression system. The controller is operative to perform a refrigerant charge detection method.

The refrigerant charge detection method includes the steps of: fully closing the flow control valve in the refrigerant injection line; closing a valve to a prescribed (e.g., minimum) flow opening; operating the compression device while unloading the first compression stage; determining an amount of superheat present in the refrigerant; determining a degree of openness of the primary expansion valve; determining a degree of openness of the valve; comparing the determined amount of superheat to a reference amount of superheat indicative of operation of the refrigerant vapor compression system with a proper refrigerant charge; comparing the degree of openness of the primary expansion valve to a degree of openness of the primary expansion valve indicative of operation of the refrigerant vapor compression system with a proper refrigerant charge; and comparing the degree of openness of the valve to a degree of openness of the valve indicative of operation of the refrigerant vapor compression system with a proper refrigerant charge. In an embodiment, controller determines whether the determined amount of superheat is higher or lower than the reference amount of superheat indicative of operation of the refrigerant vapor compression system with a proper refrigerant charge. In an embodiment, the controller determines whether the degree of openness of the primary expansion valve is larger or smaller than the degree of openness of the primary expansion valve indicative of operation of the refrigerant vapor compression system with a proper refrigerant charge. In an embodiment, the controller determines whether the degree of openness of the valve is larger or smaller than the degree of openness of the valve indicative of operation of the refrigerant vapor compression system with a proper refrigerant charge.

A refrigerant vapor compression system including a primary refrigerant circuit including a refrigerant compression device having a first compression stage and a second compression stage, a refrigerant heat rejection heat exchanger downstream of said compression device, a refrigerant heat absorption heat exchanger downstream of said refrigerant heat rejection heat exchanger, a primary expansion device disposed in the refrigerant circuit downstream of said refrigerant heat rejection heat exchanger and upstream of said refrigerant heat absorption heat exchanger, and an additional valve disposed in the primary refrigerant circuit, and a controller for controlling operation of the refrigeration vapor compression system, said controller operative to perform a refrigerant charge detection method including operating the primary refrigerant circuit to a prescribed condition, and comparing superheat and valve positions to reference values indicative of operation of the refrigerant vapor compression system with a proper refrigerant charge when the primary refrigerant circuit is at the prescribed condition to detect improper charge when at least one compared value does not match a corresponding reference value.

BRIEF DESCRIPTION OF THE DRAWINGS

For a further understanding of the invention, reference will be made to the following detailed description of the invention which is to be read in connection with the accompanying drawing, where.

DETAILED DESCRIPTION OF THE INVENTION

Figure 1:
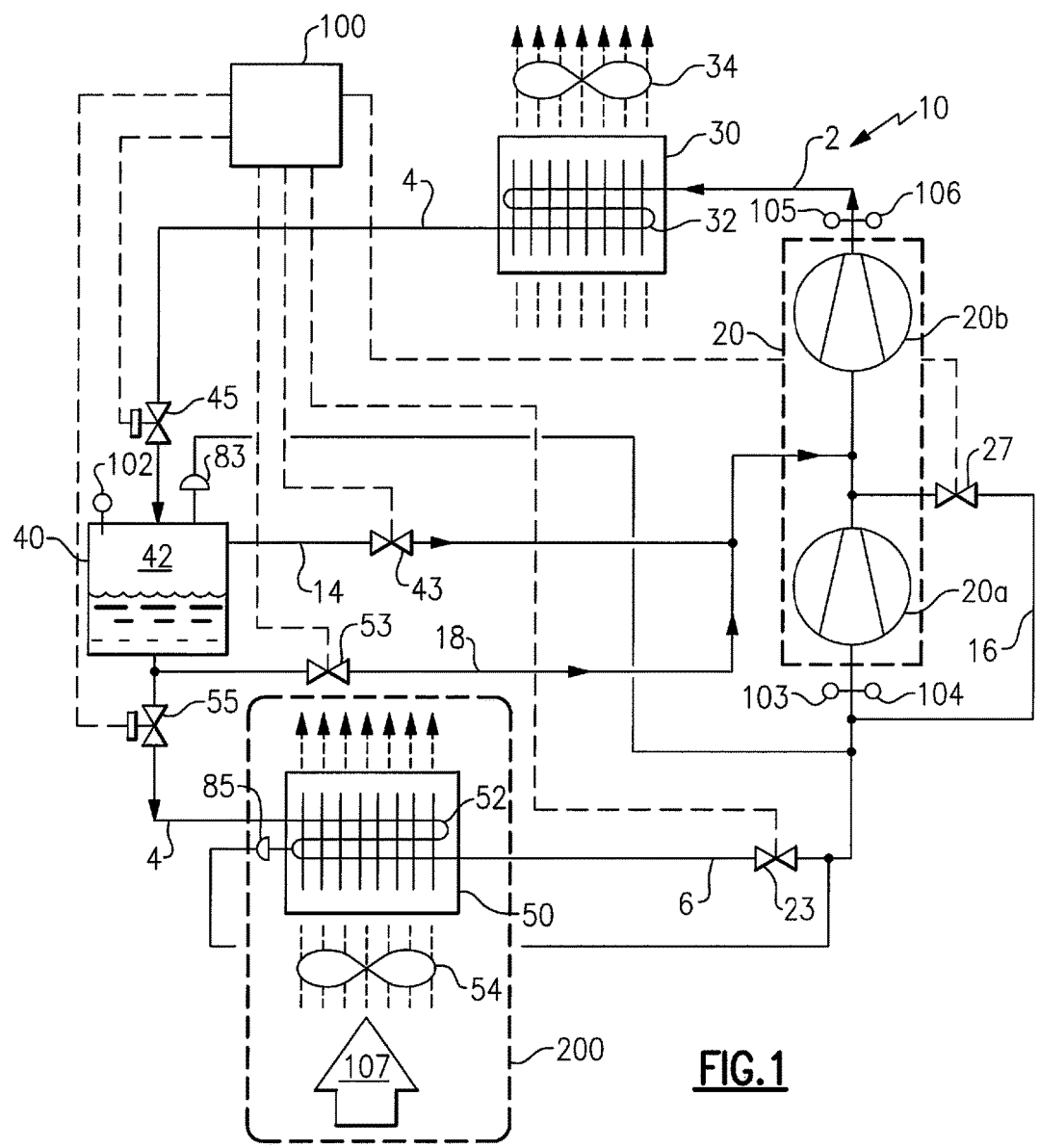
FIG. 1 is a schematic diagram illustrating a first exemplary embodiment of a refrigerant vapor compression system operable in accord with the invention.
Figure 2:
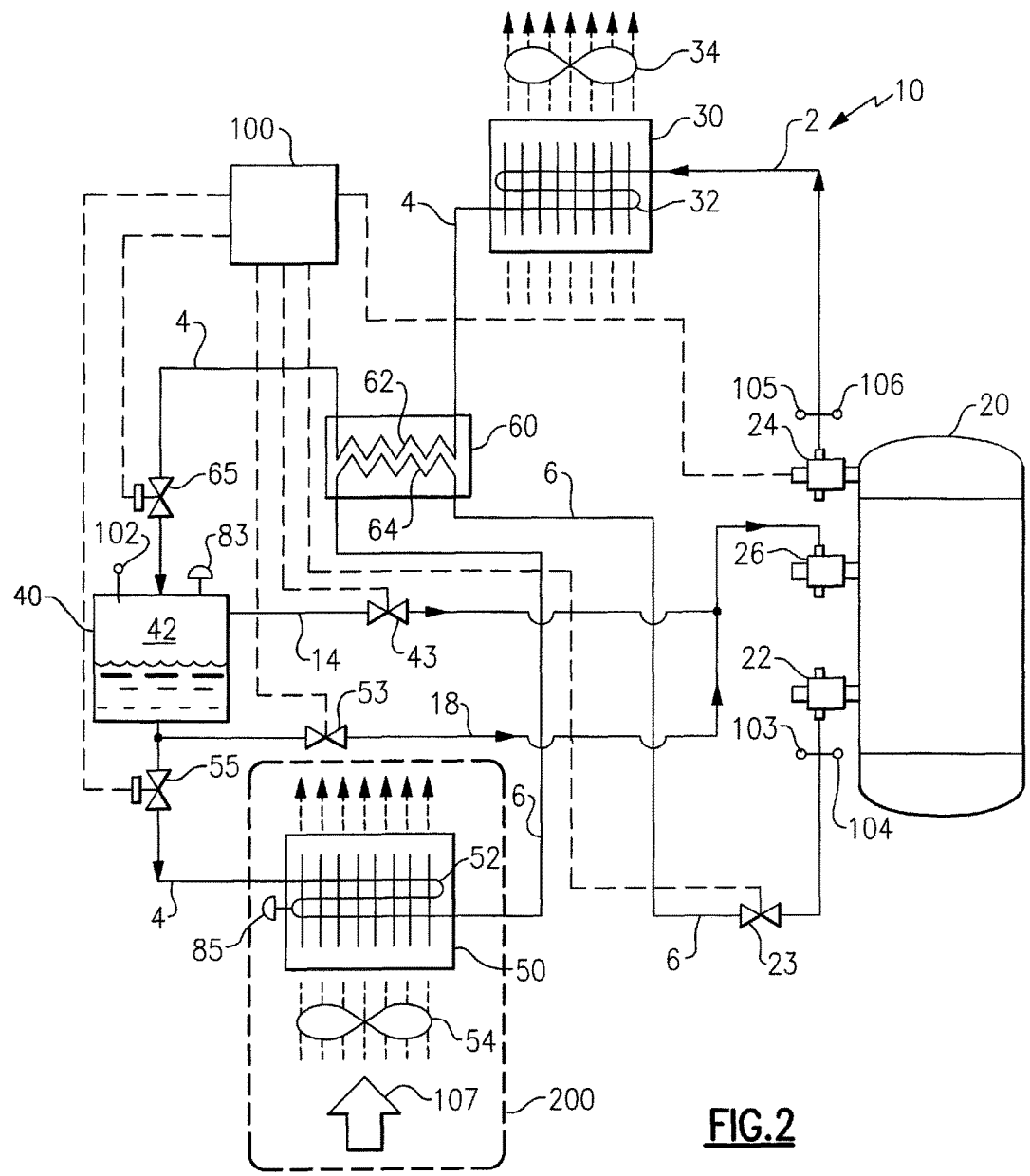
FIG. 2 is a schematic diagram illustrating a second exemplary embodiment of a refrigerant vapor compression system operable in accord with the invention.

Referring initially to FIGS. 1 and 2 of the drawing, there are depicted exemplary embodiments of a refrigerant vapor compression system 10 designed for operation in a transcritical cycle with a low critical point refrigerant, such as for example, but not limited to, carbon dioxide and refrigerant mixtures containing carbon dioxide. However, it is to be understood that the refrigerant vapor compression system 10 may also be operated in a subcritical cycle with a higher critical point refrigerant such as conventional hydrochlorofluorocarbon and hydrofluorocarbon refrigerants.

The refrigerant vapor compression system 10 is particularly suitable for use in a transport refrigeration system for refrigerating the air or other gaseous atmosphere within the temperature controlled cargo space 200 of a truck, trailer, container or the like for transporting perishable/frozen goods. The refrigerant vapor compression system 10 is also suitable for use in conditioning air to be supplied to a climate controlled comfort zone within a residence, office building, hospital, school, restaurant or other facility. The refrigerant vapor compression system could also be employed in refrigerating air supplied to display cases, merchandisers, freezer cabinets, cold rooms or other perishable/frozen product storage areas in commercial establishments.

The refrigerant vapor compression system 10 includes a multi-stage compression device 20, a refrigerant heat rejection heat exchanger 30, a refrigerant heat absorption heat exchanger 50, also referred to herein as an evaporator, and a primary expansion valve 55, such as for example an electronic expansion valve as depicted in FIGS. 1 and 2, operatively associated with the evaporator 50, with refrigerant lines 2, 4 and 6 connecting the aforementioned components in a primary refrigerant circuit. As depicted in FIG. 1, the refrigerant vapor compression system 10 may also include an unload bypass line 16 that establishes refrigerant flow communication between an intermediate pressure stage of the multi-stage compression device 20 and the suction pressure portion of the refrigerant circuit, which constitutes refrigerant line 6 extending from the outlet of the evaporator 50 to the suction inlet of the compression device 20.

Additionally, the refrigerant vapor compression system 10 of the invention includes an economizer circuit having an economizer device 40, a secondary expansion valve 45 and a refrigerant vapor injection line 14. In the depicted embodiments, the economizer circuit includes a flash tank economizer 40 interdisposed in refrigerant line 4 of the primary refrigerant circuit downstream with respect to refrigerant flow of the refrigerant heat rejection heat exchanger 30 and upstream with respect to refrigerant flow of the refrigerant heat absorption heat exchanger 50. The secondary expansion device 45 is interdisposed in refrigerant line 4 in operative association with and upstream of the economizer. The secondary expansion device 45 may be an expansion valve, such as a high pressure electronic expansion valve as depicted in FIGS. 1 and 2. Refrigerant traversing the secondary expansion device 45 is expanded to a lower pressure sufficient to establish a mixture of refrigerant in a vapor state and refrigerant in a liquid state. The flash tank economizer 40 defines a separation chamber 42 wherein refrigerant in the liquid state collects in a lower portion of the separation chamber 42 and refrigerant in the vapor state collects in the portion of the separation chamber 42 above the liquid refrigerant.

The refrigerant vapor injection line 14 establishes refrigerant flow communication between an upper portion of the separation chamber 42 of the flash tank economizer 40 and an intermediate stage of the compression process. A vapor injection flow control device 43 is interdisposed in vapor injection line 14. The vapor injection flow control device 43 may comprise a flow control valve selectively positionable between an open position wherein refrigerant vapor flow may pass through the refrigerant vapor injection line 14 and a closed position wherein refrigerant vapor flow through the refrigerant vapor injection line 14 is blocked. In an embodiment, the vapor injection flow control valve 43 comprises a two-position solenoid valve of the type selectively positionable between a first open position and a second closed position.

The refrigeration vapor compression system 10 can also include an optional variable frequency drive (VFD) or an optional suction modulation valve (SMV) 23 interdisposed in refrigerant line 6 at a location between the outlet of the refrigeration heat absorption heat exchanger 50 and the suction inlet to the compression device 20. In the exemplary embodiment depicted in FIG. 1, the suction modulation valve 23 is positioned in refrigerant line 6 between the outlet of the evaporator 50 and the point at which the compressor unload bypass line 16 intersects refrigerant line 6. In an embodiment, the suction modulation valve 23 may comprise a pulse width modulated solenoid valve.

In a refrigerant vapor compression system operating in a transcritical cycle, the refrigerant heat rejection heat exchanger 30 constitutes a gas (refrigerant vapor) cooler through which supercritical refrigerant passes in heat exchange relationship with a cooling medium, such as for example, but not limited to ambient air or water, and may be also be referred to herein as a gas cooler. In a refrigerant vapor compression system operating in a subcritical cycle, the refrigerant heat rejection heat exchanger 30 would constitute a refrigerant condensing heat exchanger through which hot, high pressure refrigerant vapor passes in heat exchange relationship with the cooling medium and is condensed to a liquid. In the depicted embodiments, the refrigerant heat rejection heat exchanger 30 includes a finned tube heat exchanger 32, such as for example a fin and round tube heat exchange coil or a fin and mini-channel flat tube heat exchanger, through which the refrigerant passes in heat exchange relationship with ambient air being drawn through the finned tube heat exchanger 32 by the fan(s) 34 associated with the gas cooler 30.

Whether the refrigerant vapor compression system 10 is operating in a transcritical cycle or a subcritical cycle, the refrigerant heat absorption heat exchanger 50 serves an evaporator wherein refrigerant liquid or a mixture of refrigerant liquid and vapor is passed in heat exchange relationship with a fluid to be cooled, most commonly air, drawn from and to be returned to a temperature controlled environment, such as the cargo box 200 of a refrigerated transport truck, trailer or container, or a display case, merchandiser, freezer cabinet, cold room or other perishable/frozen product storage area in a commercial establishment, or to a climate controlled comfort zone within a residence, office building, hospital, school, restaurant or other facility. In the depicted embodiments, the refrigerant heat absorption heat exchanger 50 comprises a finned tube heat exchanger 52 through which refrigerant passes in heat exchange relationship with air drawn from and returned to the refrigerated cargo box 200 by the evaporator fan(s) 54 associated with the evaporator 50. The finned tube heat exchanger 52 may comprise, for example, a fin and round tube heat exchange coil or a fin and mini-channel flat tube heat exchanger.

The compression device 20 functions to compress the refrigerant and to circulate refrigerant through the primary refrigerant circuit as will be discussed in further detail hereinafter. In the embodiment depicted in FIG. 1, the compression device 20 may comprise a single multiple stage refrigerant compressor, such as for example a screw compressor or a reciprocating compressor disposed in the primary refrigerant circuit and having a first compression stage 20a and a second compression stage 20b. The first and second compression stages are disposed in series refrigerant flow relationship with the refrigerant leaving the first compression stage 20a passing directly to the second compression stage 20b for further compression. Alternatively, the compression device 20 may comprise a pair of independent compressors 20a and 20b, connected in series refrigerant flow relationship in the primary refrigerant circuit via a refrigerant line connecting the discharge outlet port of the first compressor 20a in refrigerant flow communication with the suction inlet port of the second compressor 20b. In the independent compressor embodiment, the compressors 20a and 20b may be scroll compressors, screw compressors, reciprocating compressors, rotary compressors or any other type of compressor or a combination of any such compressors. In the embodiment depicted in FIG. 1, the refrigerant vapor compression system 10 includes a refrigerant bypass line 16 providing a refrigerant flow passage from an intermediate pressure stage of the compression device 20 back to the suction side of the compression device 20. An unload valve 27 is interdisposed in the bypass line 16. The unload valve 27 may be selectively positioned in an open position in which refrigerant flow passes through the bypass line 16 and a closed position in which refrigerant flow through the bypass line 16 is blocked.

In the exemplary embodiment depicted in FIG. 2, the compression device 20 comprises a scroll compressor having a suction inlet 22 and discharge outlet 24 and an intermediate port 26 opening directly to an intermediate pressure stage of the compression chamber of the compressor. In an embodiment, the scroll compressor 20 may be a digital scroll compressor.

In the embodiment depicted in FIG. 1, the refrigerant vapor compression system 10 further includes a refrigerant liquid injection line 18. The refrigerant liquid injection line 18 taps into refrigerant line 4 at location downstream of the flash tank economizer 40 and upstream of the primary expansion valve 55 and opens into an intermediate stage of the compression process. This, the refrigerant liquid injection line 18 establishes refrigerant flow communication between a lower portion of the separation chamber 42 of the flash tank economizer 40 and an intermediate pressure stage of the compression device 20. A liquid injection flow control device 53 is interdisposed in refrigerant liquid injection line 18. The liquid injection flow control device 53 may comprise a flow control valve selectively positionable between an open position wherein refrigerant liquid flow may pass through the liquid injection line 18 and a closed position wherein refrigerant liquid flow through the refrigerant liquid injection line 18 is blocked. In an alternative embodiment, the refrigerant liquid injection line 18 taps into refrigerant line 4 at a location downstream of the flash tank economizer 40 and upstream of the primary expansion valve 55 and opens into the suction inlet 22 of the scroll compressor 20. In an embodiment, the liquid injection flow control valve 53 comprises a two-position solenoid valve of the type selectively positionable between a first open position and a second closed position.

In the exemplary embodiments of the refrigerant vapor compression system 10 depicted in FIG. 1, injection of refrigerant vapor or refrigeration liquid into the intermediate pressure stage of the compression process would be accomplished by injection of the refrigerant vapor or refrigerant liquid into the refrigerant passing from the first compression stage 20a into the second compression stage 20b of the compression device 20. In the exemplary embodiment of the refrigerant vapor compression system 10 depicted in FIG. 2, injection of refrigerant vapor or refrigerant liquid into the intermediate pressure stage of the compression process would be accomplished by injection of the refrigerant vapor or the refrigerant liquid into the compression chamber of the scroll compressor 20 through the intermediate pressure port 26.

Liquid refrigerant collecting in the lower portion of the flash tank economizer 40 passes therefrom through refrigerant line 4 and traverses the primary refrigerant circuit expansion valve 55 interdisposed in refrigerant line 4 upstream with respect to refrigerant flow of the evaporator 50. As this liquid refrigerant traverses the first expansion device 55, it expands to a lower pressure and temperature before entering the evaporator 50. The evaporator 50 constitutes a refrigerant evaporating heat exchanger through which expanded refrigerant passes in heat exchange relationship with the air to be cooled, whereby the refrigerant is vaporized and typically superheated. As in conventional practice, the primary expansion valve 55 meters the refrigerant flow through the refrigerant line 4 to maintain a desired level of superheat in the refrigerant vapor leaving the evaporator 50 to ensure that no liquid is present in the refrigerant leaving the evaporator. The low pressure refrigerant vapor leaving the evaporator 50 returns through refrigerant line 6 to the suction port of the first compression stage or first compressor 20a of the compression device 20 in the embodiment depicted in FIG. 1, or to the suction inlet 22 of the scroll compressor 20 in the embodiment depicted in FIG. 2.

In the embodiment depicted in FIG. 2, the refrigerant vapor compression system 10 includes a discharge pressure-to-suction pressure heat exchanger 60. The heat exchanger 60 includes a first pass 62 interdisposed in refrigerant line 4 of the primary refrigerant circuit intermediate the gas cooler 40 and the secondary expansion device 45 and a second pass 64 interdisposed in refrigerant line 6 of the primary circuit downstream of the evaporator 50 and disposed in heat exchange relationship with the first pass 62. High pressure refrigerant vapor having traversed the gas cooler 30 passes through the first pass 62 in heat exchange relationship with suction pressure refrigerant vapor having traversed the evaporator 50. In this manner, the high pressure refrigerant vapor passing through refrigerant line 4 is further cooled and the low pressure refrigerant vapor passing through refrigerant line 6 is thereby heated.

The refrigerant vapor compression system 10 also includes a control system operatively associated therewith for controlling operation of the refrigerant vapor compression system 10. The control system includes a controller 100 that determines the desired mode of operation in which to operate the refrigerant vapor compression system 10 based upon consideration of refrigeration load requirements, ambient conditions and various sensed system operating parameters. As in conventional practice, the controller 100 also includes various sensors operatively associated with the controller 100 and disposed at selected locations throughout the system for monitoring various operating parameters by means of various sensors operatively associated with the controller. The control system may include, by way of example but not limitation, a pressure sensor 102 disposed in operative association with the flash tank economizer 40 to sense the pressure within the separation chamber 42, a temperature sensor 103 and a pressure sensor 104 for sensing the refrigerant suction temperature and pressure, respectively, and a temperature sensor 105 and a pressure sensor 106 for sensing refrigerant discharge temperature and pressure, respectively. In transport refrigeration applications, the refrigeration vapor compression system may also include a temperature sensor 107 for sensing the temperature of the air returning to the evaporator from the cargo space 200 and may also include sensors (not shown) for monitoring ambient outdoor conditions, such as or example ambient outdoor air temperature and humidity. The pressure sensors 102, 104, 106 may be conventional pressure sensors, such as for example, pressure transducers, and the temperature sensors 103, 105 may be conventional temperature sensors, such as for example, thermocouples or thermistors.

The controller 100 processes the data received from the various sensors and controls operation of the compression device 20, operation of the fan(s) 34 associated with the refrigerant heat rejection heat exchanger 30, operation of the fan(s) 54 associated with the evaporator 50, operation of the primary expansion device 55, operation of the secondary expansion device 45, and operation of the suction modulation valve 23 or operation of the variable frequency drive. The controller 100 also controls the positioning of the vapor injection valve 43 and liquid injection valve 53. The controller 100 positions the vapor injection valve 43 in an open position for selectively permitting refrigerant vapor to pass from the flash tank economizer 40 through refrigerant vapor injection line 14 for injection into an intermediate stage of the compression process. Similarly, the controller 100 positions the liquid injection valve 53 in an open position for selectively permitting refrigerant liquid to pass from the flash tank economizer 40 through refrigerant liquid injection line 18 for injection into an intermediate pressure stage of the compression process. In the FIG. 1 embodiment, the controller 100 also controls the positioning of the unload valve 27 to selectively open the unload valve 27 to bypass refrigerant from an intermediate pressure stage of the compression device 20 through bypass line 16 back to the suction side of the compression device 20 when it is desired to unload the first stage of the compression device 20.

In conventional practice, when the refrigerant vapor compression system 10 is at standstill, that is when the compression device 20 and the fans 44 and 54 are not running, the controller 100 positions the vapor injection flow control valve 43 and the liquid injection control valve 53 in the closed position thereby blocking refrigerant from flowing from the flash tank economizer 40 through the refrigerant vapor injection line 14 and the refrigerant liquid injection line 18, respectively. Additionally, the controller 100 positions each of the primary expansion device 55, the secondary expansion valve 45, and the suction modulation valve 23 closed. The flow control valves 43 and 53 operatively associated with the economizer refrigerant vapor injection line 14 and the economizer refrigerant vapor injection line 18, respectively, are necessarily designed to fully seal and block all refrigerant flow through the respective lines 14 and 18. Thus, if the secondary expansion device 45, which is disposed in refrigerant line 4 upstream of the flash tank economizer 40, and the primary expansion device 55, which is disposed in refrigerant line 4 downstream of the flash tank 40, fully seal and block all refrigerant flow therethrough, an isolated pocket is formed in the refrigerant circuit that includes the flash tank 40, the portion of refrigerant line 4 located between the primary expansion valve 55 and the secondary expansion valve 45, and the respective portions in lines 14 and 18 lying upstream with respect to refrigerant flow of the flow control valves 43, 53. Any refrigerant resident in this isolated pocket would be trapped during standstill. Similarly, if the primary expansion device 55 and the suction modulation device 23 fully seal and block all refrigerant flow therethrough, a second isolated pocket is formed in the refrigerant circuit that includes the evaporator refrigerant coil 52, the portion of refrigerant line 4 lying between the primary expansion device 55 and the inlet to evaporator refrigerant coil 52, and the portion of refrigerant line 6 lying between the outlet of the evaporator refrigerant coil 52 and the suction modulation valve 23. Any refrigerant resident in this isolated pocket would be trapped during standstill.

The portion of the refrigerant circuit downstream with respect to refrigerant flow of the refrigerant discharge outlet of the compression device 20 and upstream with respect to refrigerant flow of the secondary expansion valve 45 is referred to herein as the high-side of the refrigerant circuit. The operating refrigerant pressure existing during operation in the portion of the refrigerant circuit extending between the refrigerant discharge outlet of the compression device 20 and the inlet of the secondary expansion valve 45 is referred to herein as the high-side operating pressure. The portion of the refrigerant circuit downstream with respect to refrigerant flow of the primary expansion valve 55 and upstream with respect to refrigerant flow of the refrigerant suction inlet of the compression device 20 is referred to herein as the low-side of the refrigerant circuit. The operating refrigerant pressure existing during operation in the portion of the refrigerant circuit extending from the primary expansion valve 55 downstream to the refrigerant suction inlet to the compression device 20 is referred to herein as the low-side operating pressure. The portion of the primary refrigerant circuit lying downstream with respect to refrigerant flow of the secondary expansion valve 45 and upstream with respect to refrigerant flow of the secondary expansion valve 55 operates at a refrigerant operating pressure in a range between the low-side operating pressure and the high-side operating pressure, and is referred to herein as an intermediate operating pressure. Thus, at shut-down of the refrigerant vapor compression system 10, the refrigerant within the gas cooler/condenser coil 32 is at the high-side operating pressure, the refrigerant within the evaporator coil 52 is at the low-side operating pressure, and the refrigerant within the separation chamber 42 of the flash tank 40 is at an intermediate operating pressure.

The tubes defining the refrigerant lines 4, 6 and the evaporator refrigerant coil 52, the shell of the flash tank 40 and any other refrigerant containment structure on the low pressure side of the refrigerant vapor compression system 10 are designed to contain refrigerant therein up to a selected containment design pressure without structure failure and the resultant leakage of refrigerant from the system. Within the afore-noted isolated pockets, the pressure of the refrigerant trapped within the isolated pockets typically increases during standstill due to a rise in refrigerant temperature. Therefore, the potential exists for the refrigerant pressure within the isolated pocket to exceed the containment design pressure. In accordance with an aspect of the invention, the refrigerant vapor compression system 10 embodies one or more features that reduce or eliminate the risk of the refrigerant pressure during standstill exceeding the containment design pressure within the isolated pockets.

Figure 3:
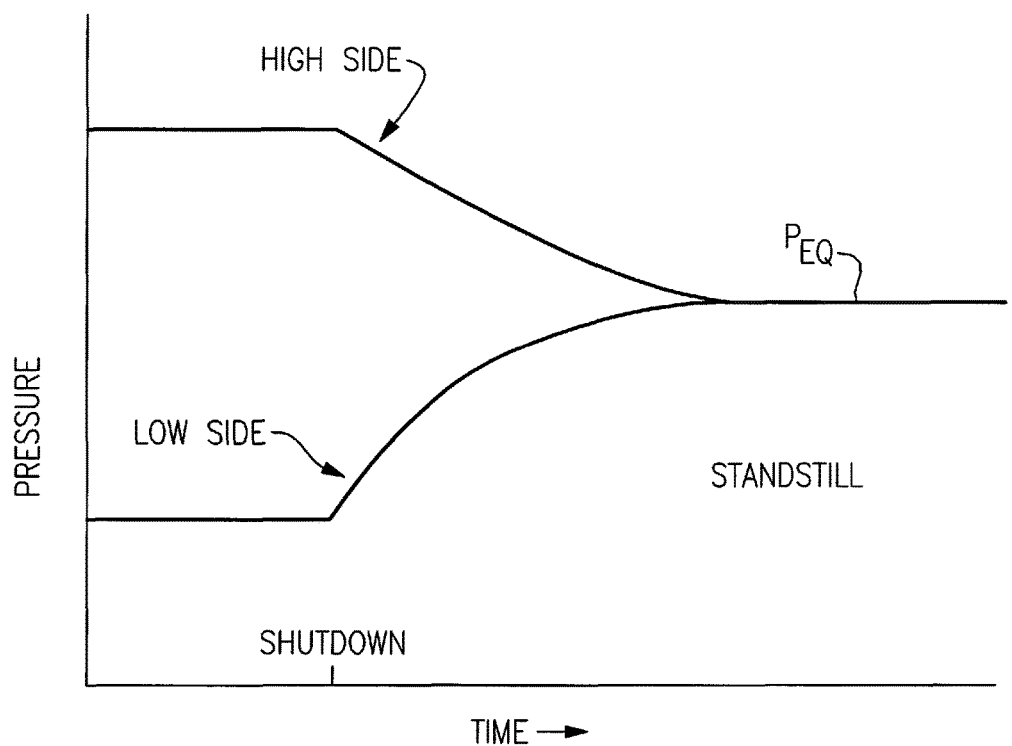
FIG. 3 is a graphical illustration of an exemplary representation of the pressure equalization process during standstill.

In an embodiment of the refrigerant vapor compression system 10, the primary expansion valve 55, the secondary expansion valve 45 and the suction modulation valve 23 or variable frequency drive are each designed or operated to ensure that a minimum flow passage therethrough exists when in the valve closed position. The existence of a minimum flow passage maybe ensured by mechanically restricting full closure of the valve within the valve itself or by providing a leakage path through the valve when in the closed position. Alternatively, the minimum flow passage may be ensured electronically by the controller 100 setting the valve at a minimum flow area opening when positioning the valve in a "closed" position at shutdown. With a minimum flow passage existing in each of the valves 55, 45, 23 when in the closed positioned, a continuous open refrigerant flow path will exist throughout the primary refrigerant circuit without any isolated pockets existing. Consequently, as illustrated in FIG. 3, the refrigerant pressure with the refrigerant vapor compression system 10 will naturally equalize during standstill to an equilibrium pressure, $P_{EQ}$, lying between the high-side operating pressure and the low-side operating pressure existing at shutdown of the system. Similarly, the refrigerant temperature will naturally equalize to an equilibrium temperature, $T_{EQ}$, lying between the high-side operating refrigerant temperature prior to shutdown and the low-side operating refrigerant temperature prior to shutdown. So long as the refrigerant containment components on the low-side pressure and intermediate pressure portion of the refrigerant vapor compression system 10 are designed at a containment design pressure in excess of the equalization pressure, the risk of damage due to overpressure during standstill is eliminated.

In an embodiment of the refrigerant vapor compression system 10, a first pressure relief valve 83 is provided in operative association with the flash tank 40 and a second pressure relief 85 is provided in operative association with the evaporator coil 52 of the evaporator 50. The first pressure relief valve 83 is operative to open upon and in the event that the pressure within the separation chamber 42 of the flash tank 40 exceeds a preselected maximum pressure limit. Thus, if the pressure of refrigerant trapped within an isolated pocket formed upon closure of the valves 45, 55, 43, 53, and therefore including the separation chamber 42 of the flash tank 40, exceeds that preselected maximum pressure limit during standstill, the first pressure relief valve 83 will open, thereby establishing a vent passage in fluid communication with the separation chamber 42 and a pressure sink through which refrigerant may vent from the separation chamber. As the refrigerant vents from the separation chamber 42 through the open first pressure relief valve 83, the pressure within the isolated pocket encompassing the separation chamber 42 will decrease. Once the pressure within the separation chamber 42 drops below the maximum pressure limit, the first pressure relief valve 83 will close, thereby terminating further release of refrigerant. The vent sink may constitute an internal sink, such as for example a low pressure portion of the refrigerant vapor compression system 10 such as the portion of the refrigerant line 6 downstream with respect to refrigerant flow of the suction modulation valve 23, as illustrated In FIG. 1, or a suction accumulator other vessel (not shown) disposed in or in fluid communication with refrigerant line 6 downstream of the suction modulation valve 23. Alternatively, the vent sink may constitute an external sink, such as the atmosphere external of the refrigerant vapor compression system 10, as illustrated in FIG. 2.

The second pressure relief valve 85 is operative to open upon and in the event that the pressure within the evaporator coil 52 exceeds a preselected maximum pressure limit. Thus, if the pressure of refrigerant trapped within an isolated pocket formed upon closure of the valves 23 and 55, and therefore including the evaporator coil 52, exceeds that preselected maximum pressure limit during standstill, the second pressure relief valve 85 will open, thereby establishing a vent passage in fluid communication with the evaporator coil 52 and a pressure sink through which refrigerant may vent from the evaporator coil 52. As the refrigerant vents from the evaporator coil 52 through the open pressure relief valve 85, the pressure within the isolated pocket encompassing the evaporator coil 52 will decrease. Once the pressure within the evaporator coil 52 drops below the maximum pressure limit, the pressure relief valve 85 will close, thereby terminating further release of refrigerant. The vent sink may constitute an internal sink, such as for example a low pressure portion of the refrigerant vapor compression system 10 such as the portion of the refrigerant line 6 downstream with respect to refrigerant flow of the suction modulation valve 23, as illustrated in FIG. 1, or a suction accumulator (not shown) or other vessel (not shown) disposed in or in fluid communication with refrigerant line 6 downstream of the suction modulation valve 23. Alternatively, the vent sink may constitute an external sink, such as the atmosphere external of the refrigerant vapor compression system 10, as illustrated in FIG. 2.

The refrigerant vapor compression system 10 is charged, i.e. filled, with a total amount of refrigerant predetermined to provide sufficient refrigerant within the system under most contemplated operating conditions. As the amount of refrigerant circulating through the refrigerant circuit of the refrigerant vapor compression system varies with the operating conditions to which the system is subjected, the refrigerant vapor compression system will be charged with more refrigerant than is actually required under some operating conditions. Thus, it is customary to provide a buffer vessel in the refrigerant circuit for holding excess refrigerant, that is refrigerant in excess of the amount of circulating refrigerant for the then prevailing operating conditions. In the exemplary embodiments of the refrigerant vapor compression system 10 depicted in FIGS. 1 and 2, the flash tank 40 functions as a buffer vessel for storing refrigerant. In refrigerant vapor compression systems not equipped with a flash tank 40 disposed between the primary and secondary expansion devices, a suction accumulator (not shown) disposed in refrigerant 6 downstream of the outlet of the evaporator coil 52 may be provided as a buffer vessel for storing refrigerant. If the pressure relief valves 83, 85 release refrigerant from the system under abnormal conditions or refrigerant otherwise leaks from the system, the refrigerant charge may decrease to levels lower than the required refrigerant charge during operating conditions that may be generally be encountered. Alternatively, during service of the refrigerant vapor pressure system 10, an amount of refrigerant or charge can be improperly added so that the system is overloaded or contains too much refrigerant.

In an embodiment, the controller 100 has the capability of detecting whether the refrigerant vapor compression system 10 is improperly charged (e.g., undercharged). According to one method of doing so, the controller 100 uses the sensed refrigerant pressure and temperature at equalization during standstill, to detect whether the refrigerant charge level is low or high. The controller 100 may use the sensed equalization refrigerant pressure and the sensed equalization refrigerant temperature to calculate the standstill refrigerant density and then compares that calculated standstill density to a predetermined reference density level. The reference density, calculated as the total refrigerant charge divided by the total volume of the refrigerant circuit lines and components available for refrigerant storage, is representative of the standstill density of a properly charged refrigerant vapor compression system 10. For example, if the calculated standstill density is below that predetermined reference refrigerant density level, then the system is undercharged. In one embodiment, the refrigerant charge can be correct or proper when it is within a proper charge range. If it is measured to use the evaporator defrost heaters to heat the refrigerant in the evaporator coil 52 during standstill, the refrigerant temperature measurement to be used should be taken sufficiently distant from the heat source, for example at the rejection heat rejection heat exchanger 30 or at the discharge of the compression device 20.

Although exemplary embodiments described herein for determining proper refrigerant charge level in a refrigerant vapor compression system have been described with respect to a standstill period following shut down, embodiments of the application are further applicable to periods when the compressor (e.g., compressor 20) is not operating.

In addition, according to embodiments of the application, the sensed equalization pressure and/or the sensed equalization temperature can be determined or approximated before the system is completely equalized. For example, the sensed equalization pressure can be determined a prescribed time after compressor shut-down or well before system equalization. In one embodiment, the sensed equalization temperature can be determined by sensing another measurable temperature in the system such as a selected temperature on the high-pressure side (e.g., liquid refrigerant temperature at the outlet of the condenser) having a known relationship or correlation to the sensed equalization temperature. Further, the sensed equalization temperature can be estimated using a relationship to a measurable temperature that is empirical determined.

Rather than explicitly calculating the standstill refrigerant density, the controller 100 may determine the refrigerant charge status by comparing the sensed equalization refrigerant pressure and temperature values to a preprogrammed set of correlated supercritical refrigerant pressure and corresponding system temperature values indicative of a properly charged system. The set of correlated supercritical refrigerant pressure and corresponding system refrigerant temperature values representative of a properly charged system may be preprogrammed into the memory of the controller 100 as a map. This method, whether in the density calculation embodiment or in the map embodiment, may be employed in transcritical refrigerant vapor compression systems when or only if the equalization state is outside of the 2-phase dome or the equalization pressure exceeds the critical pressure of the refrigerant. The controller 100 may implement this charge detection method as a pre-start test or a post-shutdown test.

In accord with another method, the controller 100 uses selected system operating characteristics as indictors of the existence of an improper low or high refrigerant charge. To implement this method, the controller 100 operates the refrigerant vapor compression system 20 in such a manner as to cause stored refrigerant resident within the system's buffer vessel, whether a flash tank 40 or an accumulator (not shown) or like device, to go back into circulation through the active components of the refrigerant vapor compression system, for example the refrigerant heat rejection heat exchanger 30 or the refrigerant heat absorption heat exchanger (evaporator) 50. The transfer of stored refrigerant from the buffer vessel into the active components of the refrigerant circuit may be accomplished, for example, by increasing the refrigerant discharge pressure from the compression device 20; by increasing the refrigerant pressure in the evaporator 50, for instance by activating the evaporator defrost heaters; by increasing air flow through the refrigerant heat rejection heat exchanger 30; by reducing the refrigerant flow rate, for instance by operating the suction modulation valve 23 (or adjusting the variable frequency drive); by reducing the compressor frequency; by unloading the first stage 20a of the compression device 20; or by pulsating the compression device 20 if the compression device 20 is a digital scroll or like compressor capable of being pulsed.

While the system is operating in such a mode, the controller 100 compares selected measured system operating characteristics with the values for those selected characteristics representative of operation in a similar mode of a comparable properly charged system. If the measured values are less than the representative values, the refrigerant charge within the system is low, indicating a loss of refrigerant. For example, the controller 100 may select one or more of the following system characteristics as the selected characteristics for the purpose of implementing the disclosed charge level detection process: the amount of evaporator outlet or suction refrigerant superheat, refrigerant pressure at the either of the heat exchangers 30, 50 and the degree of subcooling; the compressor discharge temperature; the temperature difference of the heat sink fluid across the refrigerant heat rejection heat exchanger 30 or the temperature difference of the heat source fluid across the refrigerant heat absorption heat exchanger 50; or the operating position of various valves, such as for example, but not limited to, the evaporator expansion valve 55 or the suction modulation valve 23 (or variable frequency drive). In one embodiment, the controller 100 can transition to a mode (e.g., operating conditions) that will drive refrigerant from the refrigerant buffer devices to the system while monitoring the buffer device(s). When the buffer device(s) is not empty of refrigerant after transition (or when operating at set conditions), the refrigerant vapor compression system 10 is overcharged with refrigerant. Alternatively, if the controller determines the buffer device is empty of refrigerant before completing the transition (e.g., operating conditions), the system 10 is undercharged with refrigerant. In addition, when the mode transition is complete (or when operating at set conditions), and the buffer device(s) are empty, the controller 100 can monitor the system 10 system characteristics such as superheat (e.g., at the evaporator outlet) and if the superheat value is higher (lower) than expected, the determination is that the system 10 is undercharged (overcharged) with refrigerant.

In an exemplary embodiment of this method of detecting charge level in a refrigerant vapor compression system 10 that includes an economizer circuit, for example a flash tank economizer circuit such as depicted in FIGS. 1 and 2, the controller 100 first closes the economizer vapor refrigerant injection line valve 43 and the economizer liquid refrigerant line valve 53. With the economizer refrigerant injection lines 14, 18 closed, the controller 100 operates the compression device 20 so as to increase the refrigerant discharge pressure, and reduces the opening of suction modulation valve 23 (or adjusts a variable frequency drive). If necessary, the refrigerant discharge pressure may be increased up to the maximum allowable discharge pressure limit. The opening of the suction modulation valve 23 may be reduced down to a minimum opening at which the suction pressure is at a minimum allowable suction pressure limit. The controller 100 also opens the bypass valve 27 to unload the first stage 20a of the compression device 20 through refrigerant line 16. The controller 100 also operates both the fan(s) 34 associated with the heat exchanger 30 and the fan(s) 54 associated with the heat exchanger 50. The controller 100 may also optionally operate the evaporator defrost heaters (not shown).

With the system 10 operating in the manner above described, the controller 100 then determines the amount of superheat present in the refrigerant at or near one of the outlet of the evaporator 50 or the suction inlet to the first compression stage 20a of the compression device 20. The controller 100 also determines the degree of opening of the evaporator expansion valve 55 and also of the suction modulation valve 23. The controller 100 compares these determined characteristics to the corresponding characteristics representative of a comparable refrigeration system that is fully charged. A low or high refrigerant charge level can be determined. A low refrigerant charge level is indicated if the determined degree of superheat is higher than the degree of superheat representative of a properly charged system, and/or the determined degree of opening of either of the evaporator expansion valve 55 or the suction modulation valve 23 (or adjustment of a variable frequency drive) is larger than that representative of a properly charge system.

As described herein, in one embodiment a transport refrigeration unit such as the refrigerant vapor compression system 10 can be operated in a prescribed configuration or using prescribed conditions. Then, an actual configuration or actual conditions can be measured and compared to expected values; and according to exemplary embodiments described herein, if at least one measured value deviates from the expected value, the system is not properly charged (e.g., too much or low charge).

For example, one or more valves, one or more fans, the compressor outlet, the gas cooler outlet, and/or the evaporator or the like can be set to operate under known conditions and a characteristic of the system (e.g., superheat of the refrigerant) measured and compared to expected values. Alternatively, the system could be driven to prescribed characteristic levels (e.g., superheat of the refrigerant), and then the resulting configuration (e.g., valve position) can be compared to values indicative of a properly charged system.

The terminology used herein is for the purpose of description, not limitation. Specific structural and functional details disclosed herein are not to be interpreted as limiting, but merely as basis for teaching one skilled in the art to employ the present invention. While the present invention has been particularly shown and described with reference to the exemplary embodiments as illustrated in the drawing, it will be recognized by those skilled in the art that various modifications may be made without departing from the spirit and scope of the invention. Those skilled in the art will also recognize the equivalents that may be substituted for elements described with reference to the exemplary embodiments disclosed herein without departing from the scope of the present invention.

For example, although the refrigerant vapor compression system 10 is depicted in the exemplary embodiments described herein as having a flash economizer, it is to be understood that the economizer circuit could incorporate a refrigerant-to-refrigerant heat exchanger economizer in place of the flash tank 40. In such a case, a portion of the refrigerant leaving the refrigerant heat rejection heat exchanger 30 would be diverted from the main flow of refrigerant passing through the refrigerant line 4 and then passed through the secondary expansion device 45. The expanded refrigerant would then be placed in heat exchange relationship with the main refrigerant flow to be heated to form an intermediate pressure vapor to be passed through refrigerant vapor injection line 14 into an intermediate pressure stage of the compression device 20.

Therefore, it is intended that the present disclosure not be limited to the particular embodiment(s) disclosed as, but that the disclosure will include all embodiments falling within the scope of the appended claims.

Also, while a number of particular embodiments have been set forth, it will be understood that features and aspects that have been described with reference to each particular embodiment can be used with each remaining particularly set forth embodiment. For example, features described in separate embodiments described using one drawing and be used therebetween, or features described with respect to FIG. 1 can be utilized with embodiments described using FIG. 2.

We claim:

1. A method for protecting a refrigerant vapor compression system during a standstill period following shutdown of the refrigerant vapor compression system, the refrigerant vapor compression system including a primary refrigerant circuit including a refrigerant compression device, a refrigerant heat rejection heat exchanger downstream of said compression device, a refrigerant heat absorption heat exchanger downstream of said refrigerant heat rejection heat exchanger, and a primary expansion device disposed in the refrigerant circuit downstream of said refrigerant heat rejection heat exchanger and upstream of said refrigerant heat absorption heat exchanger, an outlet of the primary expansion device being connected directly to an inlet of the refrigerant heat absorption heat exchanger; said primary refrigerant circuit having a high-pressure side upstream with respect to refrigerant flow of the primary expansion device and a low-pressure side downstream with respect to refrigerant flow of the primary expansion device and upstream of a suction inlet of the compression device; said method comprising:
whenever during standstill a refrigerant pressure within an isolated pocket on the low-pressure side of said refrigerant circuit exceeds a predetermined standstill equalization pressure limit, relieving the refrigerant pressure within said isolated pocket;
wherein relieving the refrigerant pressure within said isolated pocket comprises venting the refrigerant pressure within said isolated pocket to a portion of the low-pressure side of said refrigerant circuit downstream of the refrigerant heat absorption heat exchanger and upstream of the suction inlet of the compression device, the portion having a refrigerant pressure therein less than the predetermined maximum standstill equalization pressure limit.

2. The method for protecting a refrigerant vapor compression as recited in claim 1 wherein relieving the refrigerant pressure within said isolated pocket comprises maintaining during the standstill period an open refrigerant flow path throughout the low-pressure side of said refrigerant circuit.

3. The method of claim 1 wherein the refrigerant vapor compression system further comprises a secondary expansion device downstream of the refrigerant heat rejection heat exchanger, an economizer device downstream of the secondary expansion device, the economizer device coupled to a vapor injection line coupled to an intermediate stage of the compression device, the economizer device upstream of the primary expansion device.

4. A method for protecting a refrigerant vapor compression system during a standstill period following shutdown of the refrigerant vapor compression system, the refrigerant vapor compression system including a primary refrigerant circuit including a refrigerant compression device, a refrigerant heat rejection heat exchanger downstream of said compression device, a refrigerant heat absorption heat exchanger downstream of said refrigerant heat rejection heat exchanger, and a primary expansion device disposed in the refrigerant circuit downstream of said refrigerant heat rejection heat exchanger and upstream of said refrigerant heat absorption heat exchanger, an outlet of the primary expansion device being connected directly to an inlet of the refrigerant heat absorption heat exchanger; said primary refrigerant circuit having a high-pressure side upstream with respect to refrigerant flow of the primary expansion device and a low-pressure side downstream with respect to refrigerant flow of the primary expansion device; said method comprising:
whenever during standstill a refrigerant pressure within an isolated pocket on the low-pressure side of said refrigerant circuit exceeds a predetermined standstill equalization pressure limit, relieving the refrigerant pressure within said isolated pocket;
wherein relieving the refrigerant pressure within said isolated pocket comprises venting the refrigerant pressure within said isolated pocket to a portion of the low-pressure side of said refrigerant circuit having a refrigerant pressure therein less than the predetermined maximum standstill equalization pressure limit;
wherein relieving the refrigerant pressure within said isolated pocket comprises opening a flow control valve between said isolated pocket and the portion of the low-pressure side of said refrigerant circuit having a refrigerant pressure therein less than the predetermined maximum standstill equalization pressure limit.

* * * * *